United States Patent Office 3,549,535
Patented Dec. 22, 1970

3,549,535
MINERAL OILS CONTAINING A GRAFT POLYMER OF NATURAL RUBBER AND POLYDIENE
David W. Young, Homewood, and Richard F. Poss, Flossmoor, Ill., assignors to Sinclair Research, Inc., New York, N.Y., a corporation of Delaware
No Drawing. Original application June 24, 1965, Ser. No. 466,822, now Patent No. 3,440,187, dated Apr. 22, 1969. Divided and this application Mar. 27, 1969, Ser. No. 841,166
Int. Cl. C10m *1/28;* C10l *1/18*
U.S. Cl. 252—52    3 Claims

ABSTRACT OF THE DISCLOSURE

Mineral oil compositions containing, as a pour point depressant, a graft polymerization product of about 80 to 99% by weight of natural, pale crepe rubber and about 1 to 20% of a polydiene which is a 1,3-diene hydrocarbon of 4 to about 12 carbon atoms, e.g. 1,3-butadiene, are disclosed. Preparation of the graft polymerization product, which has a Staudinger molecular weight of about 35,000 to 250,000 may be by milling the natural rubber in the presence of the diene polymer, e.g. at temperatures of about 150 to 200° F.

---

This application is a division of application Ser. No. 466,822, filed June 24, 1965, now U.S. Pat. No. 3,440,187, issued Apr. 22, 1969.

This invention relates to a novel graft polymer having utility as a mineral oil pour point depressor. More specifically, the invention is directed to a pour depressor which is a mineral oil-soluble, graft polymer of natural pale crepe rubber and a certain liquid polydiene.

It is known in the art to add pour depressors to mineral oil bases in order to permit their flow at low temperatures. Many different types of materials depress the pour point of hydrocarbon oils, but most of the additives have to be employed in disadvantageously large concentrations to provide the desired results. Moreover, although use of certain polymers as pour depressors is known, most hydrocarbon polymers, as demonstrated by U.S. Pat. No. 3,048,479 to Ilnyckyj et al., are not effective as pour point depressors and many in fact increase the pour point.

It has now been found that a base oil-soluble graft polymer of about 1 to 20% by weight of a liquid polydiene to be described below, and about 80 to 99% by weight natural pale crepe rubber, having a Staudinger molecular weight of about 25,000 to 200,000, when added to a base mineral oil in small, effective amounts, substantially reduces the pour point of the oil. Advantageously the graft polymer is of about 3 to 10% by weight, preferably 5 to 8% by weight, polybutadiene and about 90 to 97% by weight, preferably 92 to 95% by weight, natural pale crepe rubber and the polymer has a Staudinger molecular weight of about 35,000 to 250,000. Preferably the rubber is relatively fresh, that is, not more than about one year old as measured from the time the gutta percha is removed from the natural rubber to give the crepe rubber.

The novel graft polymer of the present invention may be conveniently obtained by compounding or intimately mixing the natural rubber on a rubber mill at a temperature of about 100 to 250° F., preferably 150 to 200° F., for about 5 to 30 minutes, preferably 8 to 15 minutes, with the polybutadiene oil. The mixture reacts on the mill to form the novel graft polymer which shows improved properties in reducing the pour point of base mineral oils. The reaction of the rubber and oil is evidenced by a reduction in surface tack and an increase in molecular weight.

The polydiene oils used in this invention are normally liquid polymers generally having at least about 1.8 allylic terminal hydroxyl groups per polymer molecule on the average. These hydroxyls are attached to terminal carbon atoms which in turn are primarily primary carbons. Most advantageously, the polydiene polymer has greater than two average terminal hydroxyl groups, e.g., at least 2.1 to, say, 2.6 or even 3 or more. Also, two terminal hydroxyls are generally separated by a long carbon-carbon chain. The polydiene graft-polymerized with rubber in the composition of this invention differs from the homopolymers and copolymers of butadiene and related dienes which are commercially available as GR-S rubbers, etc. The diene polymer may have a viscosity at 30° C., of about 5–20,000 poises, preferably about 15 to 5000 poises. Often the polymer is obtained in a viscosity range of about 20 to 300 or 500 poises at 30° C. Preferred homopolymers have a viscosity of about 35 to 60 poises or about 190 to 260 poises at 30° C. Thus, the diene polymers are essentially liquids, including semi-solids flowable under moderate pressure at ambient temperatures in the range of −100° F., to 400° F., which enables them to be readily milled with the natural rubber. The hydroxyl-containing diene polymers will have number average molecular weights in the range of about 400 to about 25,000 as determined by cryoscopic, ebullioscopic or osmometric methods. The preferred hydroxyl-containing diene polymers will be in the molecular weight range of about 900 to 10,000. In contrast, conventional diene polymers such as GR-S rubber are extremely high in molecular weight, e.g., in the range of several hundred thousand and are, therefore, rubberlike materials which are not useful for graft polymerization with natural rubber. The latter diene polymers are too high in molecular weight to be worked at ambient temperatures and are not reactive with natural rubber under normal milling conditions.

The diene polymers which are used in this invention have primary hydroxyl groups which are allylic in configuration, thereby being of a more reactive nature in the graft polymerization reaction. The preferred diene polymer also has the majority of its unsaturation in the main hydrocarbon chain.

The dienes which are employed to make the first intermediate polymers are unsubstituted, 2-substituted or 2,3-disubstituted, 1,3-dienes of up to about 12 carbon atoms. The diene preferably has up to 6 carbon atoms and the substituents in the 2- and/or 3-position may be hydrogen, alkyl, generally lower alkyl, e.g., of 1–4 carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, etc. The dienes may be polymerized along with alpha-olefin monomers, e.g., styrene, to give copolymer materials suitable for use in this invention.

The choice of diene will usually depend upon properties desired in the final elastomer resin; for example, chloroprene may be used, alone or in admixture with other dienes to produce oil-resistant and flame-proof rubbers.

The hydroxyl-terminated diene polymers used in accordance with the present invention preferably have a hydroxyl-functionality greater than two, e.g., in the range of 2.1 to 2.6, although the functionality may exceed the range cited, e.g., it may range up to three or more. Those polymers of greatest utility have been found to have primary hydroxyl groups in terminal allylic positions on the main, generally longest, hydrocarbon chain of the molecule. By "allylic" configuration is meant the alpha-allylic grouping of allylic alcohol, that is, the hydroxyls of the intermediate polymer or the hydroxyl residues of the finished elastomer are attached to a carbon adjacent to a double-bond carbon.

The number and location of the hydroxyl groups and the molecular weight of the liquid polymer are for the most part a function of polymerization temperature and the type of addition polymerization system employed in forming the polymer. It has been found that diene polymers of the desired configuration may be obtained using hydrogen peroxide as the catalyst for polymerization. This free-radical addition polymerization usually takes place at a temperature of about 100 to 200° C., preferably about 100–150° C.

The reaction preferably takes place in a mutual solvent system; that is, one which dissolves both the diene monomer and the hydrogen peroxide. Suitable solvents are isopropanol, acetone, methanol, sec-butanol, n-butanol, n-propanol and like alcohols having 2 to about 12 carbon atoms.

The $H_2O_2$-solvent system is found to supply hydroxyl groups and the catalytic and solvent effects needed to produce the diene polymers of desired chemical and physical characteristics. In such a polymerization system, the alcohol serves as a solvent for the peroxide and as a solvent or diluent for the diene monomer and is used in an amount suitable to promote adequately rapid but controllable polymerization of the monomer material in the solution to form the diene polymers. The alcohol will be free of any group which would interfere with the production of the desired diene polymer. Saturated alcohols are preferred and often those having about the same carbon atom content as the diene monomer will be found most useful. Thus, propanol or isopropanol is often used in butadiene polymerization. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1% to 10% of the reaction mixture to assure a low molecular weight addition polymer product having more than about two hydroxyl groups per molecule.

The usable liquid (including semi-solid, etc.) polymers of butadiene will preferably conform to the following simplified chemical structure:

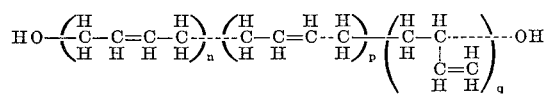

in which $n$ plus $p$ is greater than $q$, that is, the in-chain unsaturation accounts for more than 50% of the unsaturation. One or more of the H atoms appearing in the above formula will be replaced by hydroxyl in at least some of the molecules. This formula should not be understood as implying that the polymers are necessarily in blocks, but the cis-1,4-trans-1,4- and vinyl (1,2) unsaturation are usually distributed throughout the polymer molecule. The letter $n$ may be a number sufficient to give a cis-1,4-unsaturation content of about 10–30 percent; $p$ may be a number sufficient to give a trans-1,4-unsaturation content to the polymer in the range of about 40–70 percent while $q$ may be sufficient to give a pendant 1,2-vinyl unsaturation of about 10–35 percent. Often the polymer will contain largely trans-1,4-units, e.g., about 50–65 percent and about 15–25 percent cis-1,4-units, with about 15–25 percent 1,2-units. Branching may also occur in the above polymers, especially those prepared at higher temperatures. It should be emphasized, however, that the present invention is not necessarily limited to the use of hydroxyl-containing polydiolefins having the predominating tras-1,4-structure, although such are highly preferred, where otherwise suitable polymers having high cis-1,4-forms are available.

Among the mineral oil bases which are improved in accordance with this invention are normally liquid petroleum oils boiling primarily above the gasoline range and including, for instance, lubricating oils, diesel fuels, fuel oils, etc. These oils are often petroleum middle distillates and commonly have relatively high pour points, for instance, at least about −10° F., or higher. The oils can be in their relatively crude state, or they can be treated in accordance with well-known commercial methods such as acid or caustic treatment, solvent refining, clay treatment, hydrotreating, etc. Fuel oils which can be improved by the graft polymers of this invention are, for instance, hydrocarbon fractions boiling primarily in the range of about 300 to 750° F. The fuel oils can be straight run distillate fuel oils, catalytically or thermally cracked distillate fuel oils or mixtures of straight run fuel oils, naphthas and the like with cracked distillate stocks. The cracked materials will frequently be about 15 to 70 volume percent of the fuel.

The amount of the graft polymer added to the base oils may be dependent upon the particular oil employed, but in all cases will be that sufficient to reduce the pour point significantly. Often the amounts used will fall in the range of about 0.01 to 2% or more by weight, preferably about 0.05 to 1.0% by weight, based on the mineral oil. The composition may contain other ingredients such as other rubbers, carbon black, sulfur, etc. The composition of the present invention may also be used as an oil extender for synthetic rubbers. The addition of the present composition to synthetic rubber such as styrene-butadiene copolymers, provides easier low temperature blending with about 5 to 35% mineral lubricating oil to give products of better low temperature hysterisis properties.

The following examples are included to further illustrate the present invention.

EXAMPLE I

To a glass bottle containing 3 ml. of aqueous 50% by weight hydrogen peroxide was added 30 ml. of tertiary butanol and 100 grams of butadiene-1,3. The bottle was capped and placed in a steam pressure chamber and held at 120° C., for 2 hours. After cooling, the bottles were opened, and, from the polybutadiene therein, the volatiles were removed, e.g. butadiene-1,3, butadiene dimer, tertiary butanol, acetone, residual hydrogen peroxide, water, etc. This removal was accomplished with the aid of heat and vacuum, followed by steam and vacuum. The resulting product was 48 grams of clear, colorless, viscous liquid polybutadiene, having a molecular weight of about 1900 and a viscosity of about 220 poises.

EXAMPLE II 46.25 grams of pale, yellow natural crepe rubber, having a molecular weight of about 75,000 is compounded on a rubber mill with 3.75 grams of polybutadiene oil having a molecular weight of about 1900, a viscosity of about 220 poises and a hydroxyl number of about 0.802 and made by using an aqueous $H_2O_2$-mutual solvent polymerization medium, at a temperature of 170° F., for 10 minutes. An oil-soluble graft polymer results in an almost 100% yield. The polymer in an amount of 0.5% by weight is blended with a No. 2 petroleum fuel oil and the pour point (ASTM method D–97–47) is determined. The No. 2 fuel oil is a blend of 50% straight run gas oil and 50% catalytically cracked gas oil which No. 2 fuel has a pour point of 0 to −5° F. The pour point of the graft polymer-containing No. 2 fuel oil is −40° F.

The following table shows the results of adding to the No. 2 fuel oil (1) only natural pale crepe rubber (2) the product of natural pale crepe rubber milled with 3% of the polybutadiene oil having a molecular weight of about 1900, a viscosity of about 220 poises and a hydroxyl number of about 0.802 and made by using an aqueous $H_2O_2$-mutual solvent polymerization medium (3) natural pale crepe rubber milled with 7.5% of polybutadiene oil having a molecular weight of about 1900, a viscosity of about 220 poises and a hydroxyl number of about 0.802 and made by using an aqueous H₂O₂-mutual solvent polymerization medium and (4) natural pale crepe rubber milled with 10.0% of polybutadiene oil having a molecular weight of about 1900, a viscosity of about 220 poises and a hydroxyl number of about 0.802 and made by using an aqueous H₂O₂-mutual solvent polymerization medium. Milling was accomplished as noted above.

TABLE I

| Percent by weight | | |
|---|---|---|
| Percent polybutadiene | Amount added | Pour point, °F. |
| 0 | 0 | −5 |
| 0 | 0.5 | −10 |
| 0 | 1.0 | −20 |
| 0 | 2.5 | −50 |
| 0 | 3.0 | −60 |
| 3.0 | 0 | −5 |
| 3.0 | 0.05 | −10 |
| 3.0 | 0.50 | −10 |
| 3.0 | 1.00 | −40 |
| 7.5 | 0 | −5 |
| 7.5 | 0.05 | −30 |
| 7.5 | 0.50 | −40 |
| 7.5 | 1.00 | −50 |
| 10.0 | 0 | −5 |
| 10.0 | 0.05 | −20 |
| 10.0 | 0.5 | −25 |
| 10.0 | 1.00 | −30 |

From the table, it can be seen that a reduction in pour point superior to that afforded by the rubber alone is attained by adding the graft polymer to the fuel oil. Also, it is shown that the results obtained by milling only 7.5% polybutadiene with the natural rubber were superior to those obtained by milling 10% polybutadiene with the rubber.

It is claimed:

1. A liquid mineral oil boiling primarily above the gasoline range containing a small amount, sufficient to provide the said oil with a reduced pour point, of a mineral oil-soluble, polymer having a Staudinger molecular weight of about 35,000 to 250,000, said polymer being the graft polymerization product of about 80 to 99% by weight of natural, pale crepe rubber and about 1 to 20% by weight of a polydiene polymer having an average of at least about 1.8 hydroxyl groups per molecule, a viscosity at 30° C. of about 5 to 20,000 poises and a number average molecular weight of about 400 to 25,000, said diene being a 1,3-diene hydrocarbon of 4 to about 12 carbon atoms.

2. The composition of claim 1 in which the polymer has about 90 to 97% by weight natural pale crepe rubber and about 3 to 10% by weight of the polydiene polymer.

3. The composition of claim 2 in which the polydiene is polybutadiene.

References Cited

UNITED STATES PATENTS

| 2,551,641 | 5/1951 | Seger et al. | 252—59X |
| 3,089,832 | 5/1963 | Black et al. | 252—59X |
| 3,344,067 | 9/1967 | Brannen et al. | 252—52X |
| 3,462,249 | 8/1969 | Tunkel | 44—62 |

PATRICK P. GARVIN, Primary Examiner

W. J. SHINE, Assistant Examiner

U.S. Cl. X.R.

44—62, 77, 80; 252—55, 59